C. P. SKUBLIN.
INTERNAL COMBUSTION ENGINE.
APPLICATION FILED MAR. 9, 1916. RENEWED OCT. 29, 1917.
1,250,683.
Patented Dec. 18, 1917.
2 SHEETS—SHEET 1.
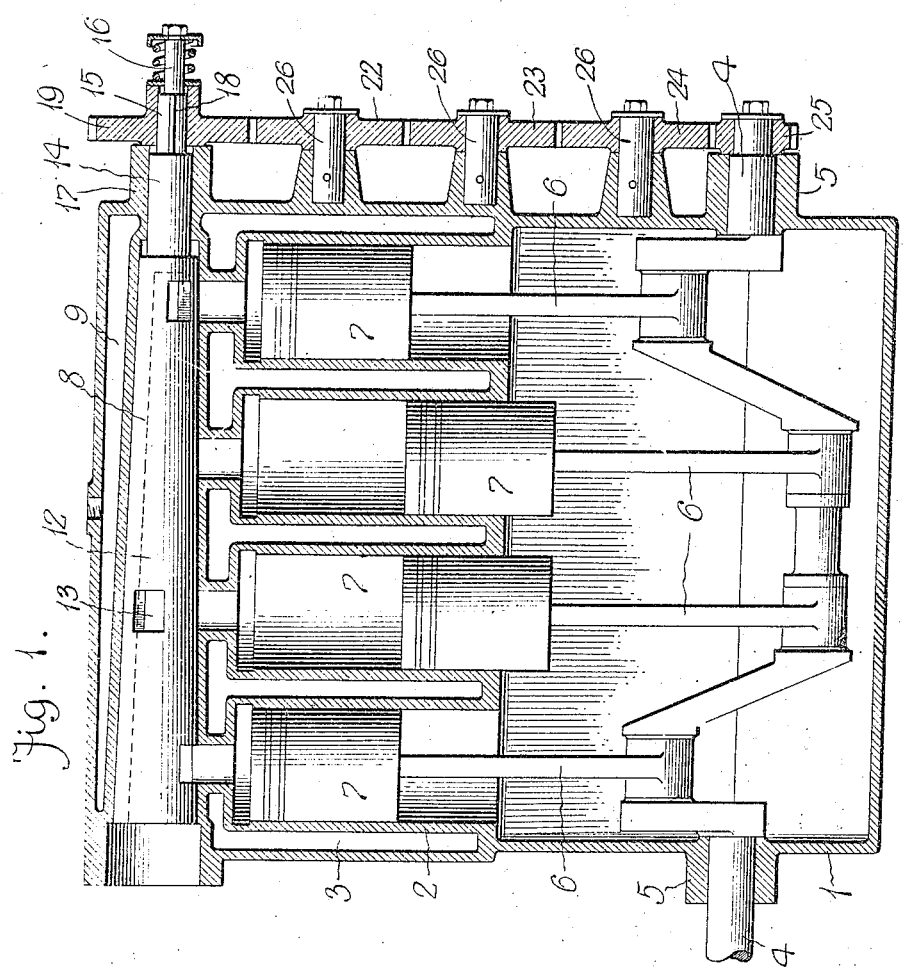
Witnesses
Chas. W. Stauffiger
Karl H. Butler
Inventor
Charles P. Skublin,
By
Attorneys C. P. SKUBLIN.
INTERNAL COMBUSTION ENGINE.
APPLICATION FILED MAR 9, 1916. RENEWED OCT. 29, 1917.
1,250,683.
Patented Dec. 18, 1917.
2 SHEETS—SHEET 2.
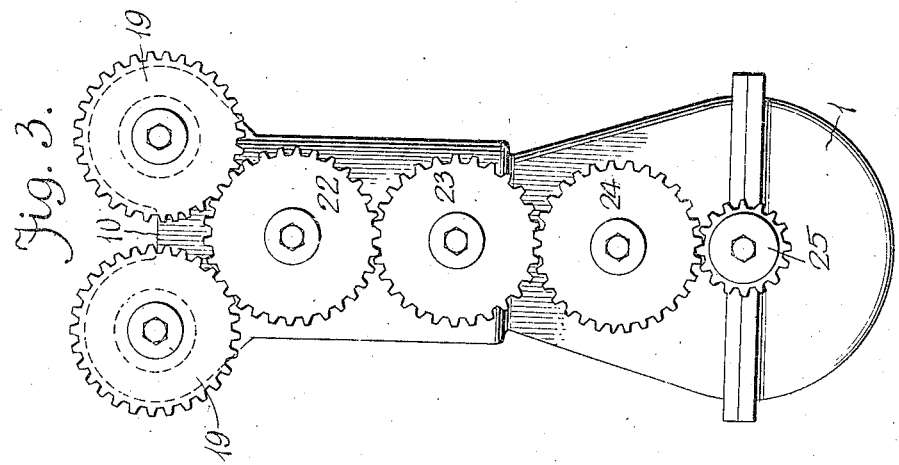
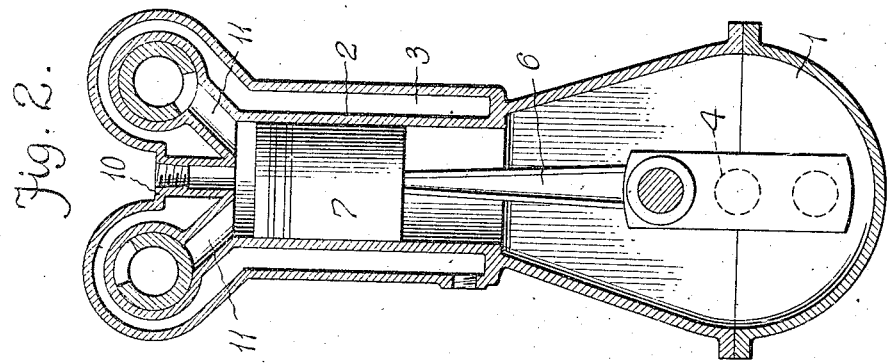
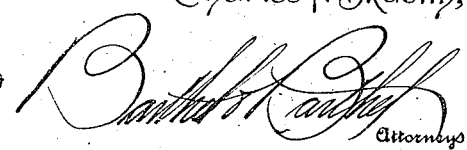

UNITED STATES PATENT OFFICE.

CHARLES P. SKUBLIN, OF DETROIT, MICHIGAN, ASSIGNOR OF ONE-HALF TO WILLIAM A. ADAMS, OF DETROIT, MICHIGAN.

INTERNAL-COMBUSTION ENGINE.

1,250,683.

Specification of Letters Patent. Patented Dec. 18, 1917.

Application filed March 9, 1916, Serial No. 83,015. Renewed October 29, 1917. Serial No. 199,211.

*To all whom it may concern:*

Be it known that I, CHARLES P. SKUBLIN, a citizen of the United States of America, residing at Detroit, in the county of Wayne and State of Michigan, have invented certain new and useful Improvements in Internal-Combustion Engines, of which the following is a specification, reference being had therein to the accompanying drawings.
This invention relates to internal combustion engines, such as may be advantageously used in connection with automobiles, motor boats, aeroplanes, and various types of vehicles, and more particularly to a novel valvular arrangement by which the efficiency of such engine may be materially increased.

My invention aims to obviate the necessity of using a cam shaft, tappet valves and their appurtenant parts, by substituting therefor rotary valves common to all of the cylinders of an engine for accurately controlling the intake and exhaust of the cylinders.
My invention further aims to furnish an explosive engine with rotary valves and a novel train of gears for operating the valves in timed relation to the cycle of the engine.

My invention further aims to provide an internal combustion engine whereby the parts are assembled with a view of reducing the cost of manufacture and at the same time retain the features by which safety, durability and simplicity of construction are secured, and with such ends in view, my invention resides in the novel construction to be hereinafter specifically described and then claimed.

Reference will now be had to the drawing, wherein—

Figure 1 is a longitudinal sectional view of an internal combustion engine in accordance with this invention;

Fig. 2 is a vertical cross sectional view of the same, and

Fig. 3 is an end view of the engine illustrating in elevation a train of valve operating gears.

In describing my invention by aid of the views above referred to, I desire to point out that the same are merely intended as illustrating an example whereby my invention may be applied in practice, and I do not care to confine my invention to the precise construction and arrangement of parts shown.
The following description is therefore to be broadly construed as including substitute constructions and arrangements of parts which are the obvious equivalent of those to be hereinafter referred to.

In the drawing, 1 denotes a crank case having cylinders 2 *en bloc* provided with water jackets 3.

4 denotes a crank shaft journaled in bearings 5 in the crank case, and connected to said crank shaft are connecting rods 6 of pistons 7 operable in the cylinders 2. The elements thus far described are of the conventional form common to many types of explosive engines.

My invention resides in providing the upper ends of the cylinders 2 with longitudinal tapering valve bodies 8 inclosed by water jackets 9 communicating with the water jackets 3. The valve bodies 8 have the longitudinal axes thereof parallel and at opposite sides of the longitudinal axes of the cylinders 2, said cylinders having spark plug connections 10 in the vertical axes of said cylinders, as best shown in Fig. 2. The tapering valve bodies 8 have the large ends thereof open for connection with intake and exhaust pipes (not shown), and intermediate the ends of said valve bodies there are a plurality of intake and exhaust connections 11 with the upper ends of the cylinders 2, said intake and exhaust connections being necessarily angularly disposed to establish communication between the cylinders and the offset valve body.

Rotatable in the valve bodies 8 are tapering hollow valves 12 provided with spaced radial ports 13 adapted to successively communicate with the intake and exhaust connections 11 of the cylinders 2 to supply said cylinders with an explosive mixture and exhaust spent gases therefrom. The size and arrangement of the ports 13 is such that the intake and exhaust of the cylinders will take place in timed relation and in proper order corresponding to the firing of the cylinders. The outer ends of the tapering rotary valves 12 are open to communicate with the intake and exhaust connections and the inner ends of said valve are reduced or stepped as at 14, 15 and 16, to permit of a valve actuating mechanism being installed to properly rotate the valves 12. The reduced portions 14 of the valves extend into bearings 17 of the valve bodies 8 and the reduced portions 15 are provided with feathers or keys 18 for small gear wheels 19 adapted for rotative continuity with the valves 12. The small gear wheels 19 are slidably retained upon the reduced portions 15 of the valves, by coiled compression springs 20 encircling the reduced portions 16 of the valves, between the small gear wheels 19 and caps or cups 21 mounted upon the reduced portions 16 of the valves.

Meshing with the small gear wheels 19 is a gear wheel 22 forming part of a train of gears adapted to impart movement to the valves 12 from the crank shaft 4 of the engine. Associated with the gear wheel 22 are other gear wheels 23, 24 and 25. The gear wheels 22, 23 and 24 are revoluble on stub shafts 26 carried by the end of the engine and the gear wheel 25 is mounted on a protruding end of the crank shaft 4. All of the gear wheels are proportioned to rotate the valves 12 in synchronism and timed relation to properly supply and exhaust the cylinders of the engine.

It is thought that the operation and utility of the valves and the operating mechanism thereof will be apparent without further description, but I desire to call particular attention to the simplicity of construction, as the valve and the operating mechanism thereof consists of comparatively few parts that are easy to maintain in an operable condition, thus avoiding any complications in connection with the engine. These same valves and the operating mechanism thereof are applicable to pumps, compressors and other apparatus where it is desired to automatically control a plurality of ports.

What I claim is:—

The combination with an explosive engine having cylinders, a crank shaft, pistons in said cylinders and connecting rods between said piston and said crank shaft, of tapering valve bodies common to all of said cylinders and disposed in parallelism at opposite sides of the vertical axes of said cylinders, said valve bodies having open ends adapted for connection with intake and exhaust pipes, hollow ported tapering rotary valves in said valve bodies having reduced ends protruding therefrom, the tapering portions of said valves being of less length than the tapering portions of said valve bodies, angularly disposed connections between the upper ends of said cylinders and said valve bodies adapted to establish communication between said cylinders and said valves, gear wheels slidably keyed on the reduced ends of said valves against the ends of said valve bodies, means on the reduced ends of said valves exteriorly of said valve bodies maintaining said gear wheels against said valve bodies and said valves seated in said valve bodies, and a train of gears driven by said crank shaft and adapted to impart movement to the gears of said valves to rotate said valves and supply and exhaust said cylinders in timed relation to the firing thereof.

In testimony whereof I affix my signature in presence of two witnesses.

CHARLES P. SKUBLIN.

Witnesses:
KARL H. BUTLER,
ANNA M. DORR.